United States Patent [19]

Asano

[11] Patent Number: 4,783,610

[45] Date of Patent: Nov. 8, 1988

[54] PIEZOELECTRIC ACTUATOR

[75] Inventor: Hitoshi Asano, Obu, Japan

[73] Assignee: Aisan Kogyo Kabushiki Kaisha, Obu, Japan

[21] Appl. No.: 172,265

[22] Filed: Mar. 23, 1988

[30] Foreign Application Priority Data

Apr. 20, 1987 [JP] Japan .............................. 62-59656[U]

[51] Int. Cl.$^4$ ............................................ H01L 41/08
[52] U.S. Cl. ................................ 310/328; 101/93.48; 400/124
[58] Field of Search .................... 310/328, 330–332; 400/121, 124, 157.2; 101/93.04, 93.05, 93.48

[56] References Cited

U.S. PATENT DOCUMENTS

| | | | |
|---|---|---|---|
| 4,318,023 | 3/1982 | O'Neill | 310/328 |
| 4,547,086 | 10/1985 | Matsumoto et al. | 310/328 X |
| 4,570,095 | 2/1986 | Uchikawa | 310/328 |
| 4,633,118 | 12/1986 | Kosugi | 310/328 |
| 4,675,568 | 6/1987 | Uchikawa et al. | 310/328 |
| 4,703,215 | 10/1987 | Asano et al. | 310/328 |
| 4,706,230 | 11/1987 | Inoue et al. | 310/328 X |

FOREIGN PATENT DOCUMENTS 60-81568  5/1985  Japan .

Primary Examiner—Mark O. Budd
Attorney, Agent, or Firm—Dennison, Meserole, Pollack & Scheiner

[57] ABSTRACT

In a piezoelectric actuator including a piezoelectric element, a pair of lever arms arranged on opposite sides of the piezoelectric element and a flexible member mounted between free ends of the lever arms, wherein deformation of the piezoelectric element is magnified to greatly displace the flexible member at a central position thereof; the improvement wherein the flexible member comprises a loop member and further comprising a support member for supporting the flexible member located at the central position of the flexible member in such a manner that opposite portions at the central position of the flexible member between the lever arms are outwardly flexed, whereby the flexible member has a substantially diamond shape in plan with a diagonal defined by a center line connecting the lever arms.

6 Claims, 3 Drawing Sheets

PIEZOELECTRIC ACTUATOR

BACKGROUND OF THE INVENTION

The present invention relates to a device for magnifying the amount of deformation occurring in a piezoelectric element Generally, when voltage is applied to the piezoelectric element, it is distorted to be deformed. Such deformation is greatly responsive to time, and a force to be generated by the deformation is large. Therefore, the piezoelectric element has superior chracteristics as a driving force for generating a mechanical displacement.

However, as the amount of deformation of the piezoelectric element is generally small, it is necessary to magnify such a small deformation of the piezoelectric element and convert the same into a large amount of displacement when it is used as the driving source. In the circumstances, there have been proposed various devices for magnifying the small deformation of the piezoelectric element and converting the same into the large amount of displacement (which devices will be hereinafter referred to as a piezoelectric actuator).

FIG. 4 is an example of the structure of a conventional piezoelectric actuator which structure is described in Japanese Patent Laid-Open Publication No. 60-81568. Referring to FIG. 4, reference numeral 5 designates a stack of plural piezoelectric elements (PZT, for example). The stacked piezoelectric elements 5 have a property of vertically expanding when voltage is applied across the piezoelectric elements 5 by way of a lead wire (not shown). The stacked piezoelectric elements 5 are fixed between a base 4 and a connecting member 6. The piezoelectric actuator is provided with a pair of lever arms 2. The lever arms 2 are connected through a pair of hinges 3 to the base 4, and are also connected through a pair of hinges 7 to the connecting member 6. An elastic beam 1 is mounted between opposite upper free ends 2c of the lever arms 2. FIG. 4 shows a condition where no voltage is applied to the piezoeletric elements 5. Under the condition shown in FIG. 4, the elastic beam 1 is stably maintained linear.

When voltage is applied to the stacked piezoelectric elements 5, they are vertically expanded to rotate the lever arms 2 in counter directions such that the distance between both the opposite upper free ends 2c decreases. As a result, the elastic beam 1 is upwardly flexed. The elastic beam 1 is provided at its central position with a mechanically displacing member 8. Accordingly, a small amount of deformation of the piezoelectric elements 5 can be magnified by the lever arms 2 and the elastic beam 1 to thereby greatly vertically displace the mechanically displacing member 8.

The present invention relates particularly to such a piezoelectric actuator of a type capable of magnifying the amount of deformation of the piezoelectric elements by the pair of lever arms.

FIG. 5 is a plan view of the piezoelectric actuator shown in FIG. 4. The elastic beam 1 is of a substantially linear shape in plan, and it tends to be easily deformed or vibrated when a sideward external force as depicted by an arrow F is applied thereto, causing a less durability.

Such a problem of durability may be considered to be solved by increasing the width of the elastic beam 1. Such an increase in width of the elastic beam 1 requires an increase in width of the lever arms 2. However, since the lever arms 2 are members for contributing to the deformation, the increased width of the lever arms is not desired from the viewpoint of responsiveness to time.

Further, when a rate of magnification of displacement is intended to be changed in the conventional piezoelectric actuator, various lever arms and elastic beams having different sizes are necessary.

SUMMARY OF THE INVENTION

Accordingly, it is an object of the present invention to provide a piezoelectric actuator which is hardly vibrated upon application of a sideward external force.

It is another object of the present invention to provide a piezoelectric actuator which can effect various rates of magnification only by changing a single member.

In order to solve the above problem, the present invention employs a flexible loop member instead of the elastic strip, and the loop member is mounted between a pair of lever arms at free ends thereof in such a manner that the substantially central portions of the loop member (a central position between the pair of lever arms) are outwardly expanded in opposite directions.

With this arrangement, it is possible to reduce the vibration upon application of a sideward external force to the piezoelectric actuator. Furthermore, the rate of magnification of displacement can be varied only by changing a single member for supporting the flexible loop member under the outwardly expanded condition between the pair of lever arms.

The invention will be more fully understood from the following detailed description and appended claims when taken with the drawings.

DETAILED DESCRIPTION OF THE PREFERRED EMBODIMENT

Figure 1:
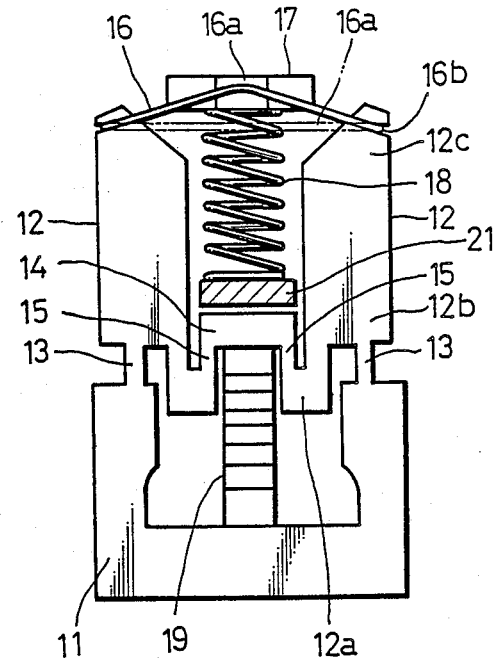
FIG. 1 is an elevational view, partially shown in section, of a preferred embodiment of the piezoelectric actuator according to the present invention.

Referring to FIG. 1, reference numeral 19 designates a stack of plural piezoelectric elements. The stacked piezoelectric elements 19 have a property of vertically expanding when voltage is applied across the piezoelectric elements 19 by way of a lead wire (not shown). The stacked piezoelectric elements 19 are fixed beween a base 11 and a connecting member 14. The piezoelectric actuator is provided with a pair of lever arms 12. The lever arms 12 are connected through a pair of hinges 13 to the base 11, and are also connected through a pair of hinges 15 to the connecting member 14. In this embodiment, both the hinges 13 and 15 are formed of thin plates which are hardly expanded and contracted in their longitudinal direction, but are easily flexed in the direction across their thickness. The hinges 13 and 15 are integrally formed with the base 11, the connecting member 14 and the lever arms 12. When voltage is applied to the stacked piezoelectric elements 19, they are vertically expanded. The force generated by the deformation of the piezoelectric elements 19 is applied through the connecting member 14 to opposed lower ends 12a of the lever arms 12 to thereby outwardly rotate the lever arms 12 about opposed fulcrum portions 12b of the lever arms 12. As a result, the distance between the upper free ends 12c of the lever arms 12 is expanded.

Figure 2:
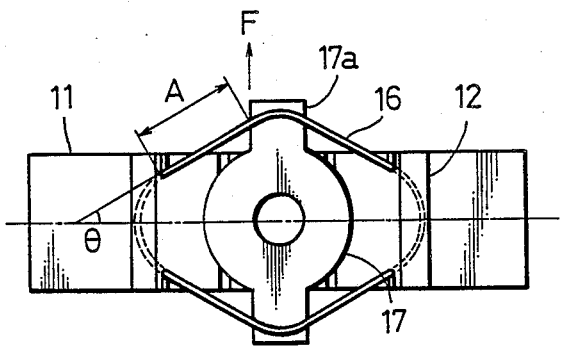
FIG. 2 is a plan view of the piezoelectric actuator shown in FIG. 1.

A flexible member 16 is connected at opposite ends 16b to both the free end portions 12c of the lever arms 12 under the condition where opposite central portions are upwardly flexed as shown in FIG. 1. As shown in FIG. 2, the flexible member 16 is constructed of a loop member formed from a sheet steel, a metal wire and the like. A support member 17 is located at the central position of the flexible member 16 in such a condition as to expand the opposite central portions of the loop member 16 between the pair of lever arms 12. A return spring 18 is interposed under compression between the support member 17 and a spring stopper 21. The spring stopper 21 is fixed on the upper surface of the base 11 to support the lower end of the return spring 18. Thus, the support member 17 is held between the flexible member 16 and the return spring 18, and the central portions of the flexible loop member 16 between the pair of lever arms 12 are flexed upwardly.

Figure 6:
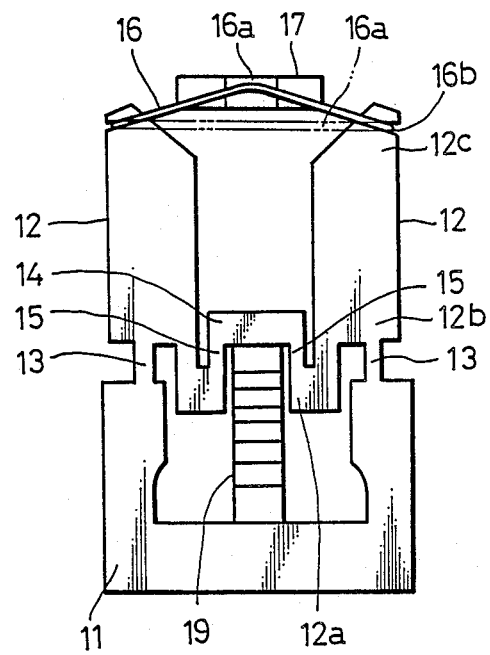
FIG. 6 is an elevational view similar to FIG. 1, showing a second preferred embodiment of the present invention.

FIG. 6 shows a second preferred embodiment of the present invention. In this embodiment, the same reference numerals designate the same parts as in the previous embodiment. The flexible member 16 is formed of a spring material. In this case, the flexible member 16 under upwardly flexed condition is mounted to the lever arms 12, and the return spring 18 is omitted. The support member 17 is directly fixed to the flexible member 16 by welding or the like.

In operation, when no voltage is applied to the piezoelectric elements 19, the support member 17 is biased by the return spring 18 to upwardly flex the flexible member 16 as shown by a solid line in FIG. 1. When a voltage is applied to the piezoelectric elements 19, the piezoelectric elements 19 are expanded to outwardly move the free end portions 12c of the lever arms 12 and accordingly outwardly displace both the ends 16b of the flexible member 16. As a result, the flexible member 16 is deformed against the return force of the return spring 18 as shown by a chain line in FIG. 1, and accordingly the support member 17 is downwardly displaced. When the supply of voltage to the piezoelectric elements 19 is stopped, the piezoelectric elements 19 are contracted to return the free end portions 12c to the original position. The flexible member 16 is biased through the support member 17 by the return force of the return spring 18, and is moved to the original position shown by the solid line.

In the second embodiment wherein the flexible member 16 is formed of a spring material and accordingly the return spring 18 is not provided as previously mentioned, the flexible member 16 is returned to its original position by its elasticity when the supply of voltage to the piezoelectric elements 19 is stopped.

Figure 3:
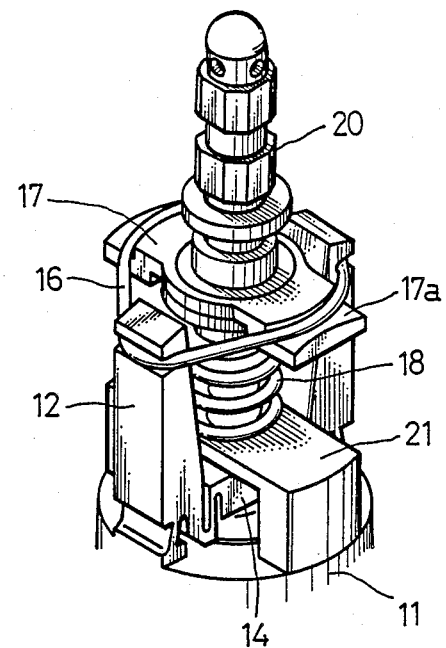
FIG. 3 is a perspective view of the piezoelectric actuator shown in FIG. 1 under the condition where a valve member of a fuel injector is mounted to the piezoelectric actuator.

In this manner, the support member 17 connected to the central portions 16a of the flexible member 16 is vertically displaced with the deformation of the piezoelectric elements 19 being magnified. FIG. 3 shows an embodiment that a valve member 20 of a fuel injector for an internal combustion engine is connected to the support member 17. In this embodiment, the valve member 20 can be reciprocated by the piezoelectric actuator of the present invention, thereby opening and closing a fuel nozzle(not shown) and controlling fuel injection.

In the event that a sideward external force F as depicted by an arrow in FIG. 2 is applied to the flexible member 16 during the operation of the piezoelectric actuator, each side of the diamond with a diagonal defined by a center line connecting the lever arms 12 formed by the flexible member 16 resists against the deformation of the flexible member 16, thereby preventing the vibration of the flexible member 16.

Figure 5:
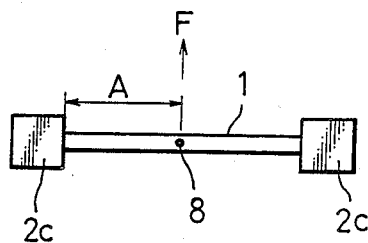
FIG. 5 is a plan view of the piezoelectric actuator shown in FIG. 4.
Figure 4:
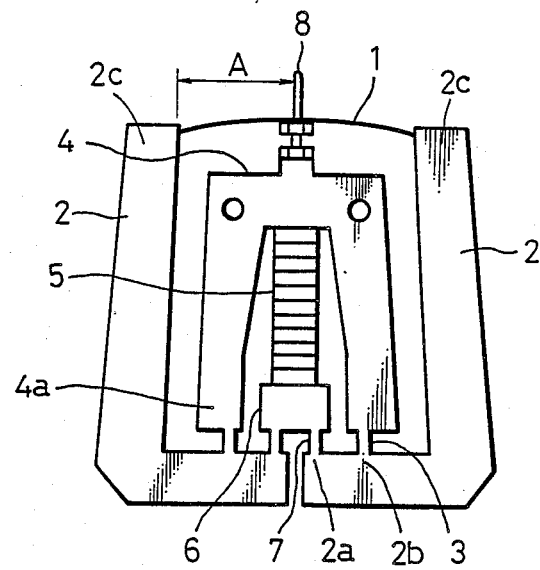
FIG. 4 is an elevational view of the piezoelectric actuator in the prior art.

Referring to FIG. 5, when a sideward external force F is applied to the central portion of the flexible member 1, a maximum stress and a maximum flection of the flexible member 1 depends on a bending moment F x A. To the contrary, a bending moment of the flexible member 16 shown in FIG. 2 is $F \times A \times \cos\theta$. Accordingly, if a modulus of section and a bending rigidity of the flexible member 16 against the external force F are the same as those of flexible member 1, the bending moment of the flexible member 16 is smaller by $\cos\theta$ than that of the flexible member 1, and accordingly the stress and the flextion are made small.

Further, the distance A as shown in FIG. 2 influencing on a rate of magnification can be changed by changing a width of contacting portions 17a of the support member 17. That is, the distance A can be reduced by increasing the width of the contacting portion 17a, and vice versa. Accordingly, the rate of magnification can be arbitrarily changed by changing the support member 17 only.

Further, in the prior art actuator as shown in FIG. 5, the larger is an operating member to be mounted to the mechanically displacing member 8, the more the distance between the lever arms 2 should be increased in order to obtain a desired rate of magnification. To the contrary, according to the present invention, the size of the operating member does not interfere with the width of the contacting portions 17a of the support member 17. Accordingly, even when a large operating member is mounted on the support member 17, the distance between the lever arms is unnecesary to increase.

Having thus described the preferred embodiments of the invention, it should be understood that numerous structural modifications and adaptations may be made without departing from the spirit of the invention.

What is claimed is:

1. In a piezoelectric actuator including a piezoelectric element, a pair of lever arms arranged on opposite sides of said piezoelectric element and a flexible member mounted between free ends of said lever arms, wherein deformation of said piezoelectric element is magnified to greatly displace said flexible member at a central position thereof; the improvement wherein said flexible member comprises a loop member and further comprising a support member for supporting said flexible member located at the central position of said flexible member in such a manner that opposite portions at the central position of said flexible member between said lever arms are outwardly expanded, whereby said flexible member has a substantially diamond shape in plan with a diagonal defined by a center line connecting said lever arms.

2. The piezoelectric actuator as defined in claim 1 further comprising a resilient member for normally biasing said flexible member in a direction counter to the location of said piezoelectric element.

3. The piezoelectric actuator as defined in claim 2, wherein said support member is held between said resilient member and said flexible member, whereby said flexible member normally receives a resilient force in the direction counter to the location of said piezoelectric element through said support member.

4. The piezoelectric actuator as defined in claim 1, wherein said flexible member is formed of a spring material, and when said flexible member is mounted between said lever arms under no external force, said flexible member is flexed stably in a direction counter to the location of said piezoelectric element, whereby said flexible member is normally maintained in a flexed condition when no external force is applied.

5. The piezoelectric actuator as defined in claim 1, wherein said support member is fixed to said flexible member.

6. The piezoelectric actuator as defined in claim 1, wherein a contact length of said support member with said flexible member is changeable so as to vary a rate of magnification of said piezoelectric actuator.

* * * * *